United States Patent [19]

Baker

[11] Patent Number: 5,303,169
[45] Date of Patent: Apr. 12, 1994

[54] METHOD FOR CALIBRATING A WALL THICKNESS INSPECTION MACHINE

[75] Inventor: Russ J. Baker, Horseheads, N.Y.

[73] Assignee: Emhart Industries, Inc., Towson, Md.

[21] Appl. No.: 675,099

[22] Filed: Mar. 19, 1991

[51] Int. Cl.$^5$ .............................................. G06F 15/20
[52] U.S. Cl. ................................ 364/571.01; 364/563; 324/662
[58] Field of Search ...................... 364/571.01, 571.02, 364/563, 473, 550, 552, 560; 73/1 J; 324/671; 209/522

[56] References Cited

U.S. PATENT DOCUMENTS

| | | | |
|---|---|---|---|
| 4,553,217 | 11/1985 | Daudt et al. | 364/473 |
| 4,870,342 | 9/1989 | Scott | 324/662 |
| 4,996,658 | 2/1991 | Baker | 364/571.04 |
| 5,097,216 | 3/1992 | Dimmick, Sr. et al. | 324/671 |

Primary Examiner—Thomas G. Black
Assistant Examiner—Michael Zanelli
Attorney, Agent, or Firm—Spencer T. Smith

[57] ABSTRACT

A computer senses a voltage which is representative of wall thickness and defines with the use of a voltage/thickness curve the thickness of that wall portion. To define this curve, a plurality of voltage/thickness points are inputted by a sensor into the computer Each point is defined by sensing and defining the voltage of a wall portion on a calibration standard having a known thickness and defining a calibration thickness corresponding to that voltage using the following equation {(((Calibration Standard Diameter in inches — Container Diameter in inches) × 0.2) + 1} × Calibration Standard Thickness in mils, and equating these calibration thicknesses to the corresponding voltages produced by the sensor when sensing at least two thicknesses of the standard.

1 Claim, 2 Drawing Sheets

| CALIBRATE HEAD |||||||||
|---|---|---|---|---|---|---|---|
| CALIBRATION |||||||||
| CHANNEL 1 || CHANNEL 2 || CHANNEL 3 || CHANNEL 4 ||
| THK | VOLT | THK | VOLT | THK | VOLT | THK | VOLT |
| .035 | 2.56 | .035 | 2.32 | .035 | 2.52 | .035 | 2.44 |
| .045 | 2.68 | .045 | 2.50 | .045 | 2.60 | .045 | 2.58 |
| .060 | 2.80 | .060 | 2.72 | .060 | 2.78 | .060 | 2.75 |
| .088 | 3.00 | .088 | 2.90 | .088 | 2.95 | .088 | 2.93 |

METHOD FOR CALIBRATING A WALL THICKNESS INSPECTION MACHINE

The present invention relates to systems for inspecting the wall thickness of formed glass containers.

BACKGROUND OF THE INVENTION

State of the art systems sense the wall thickness of formed glass containers and issue a voltage signal representative of that sensed thickness. Calibration standards are available in a limited number of diameters and each set of calibration standards provides four different reference voltage locations. Where the bottle to be formed is $3\frac{1}{4}''$, for example, an operator can gage from two to four of these reference locations on the $3\frac{1}{4}''$ standard and equate these to voltages. The control, based on this information, can define an equation for converting voltage to wall thickness.

Where, however, the formed bottle has a diameter different than a calibration standard diameter the operator has to guess what the thickness will be for a given voltage reading and this guessing process has been very difficult in practice.

OBJECTS OF THE INVENTION

It is accordingly an object of the present invention to provide a straightfoward approach to calibrate a conventional wall thickness inspection system.

Other objects and advantages of the present invention will become apparent from the following portion of this specification and from the accompanying drawings which illustrates in accordance with the mandate of the patent statutes a presently preferred embodiment incorporating the principles of the invention.

BRIEF DESCRIPTION OF THE DRAWING

Referring to the drawings.

Figures 1, 2:
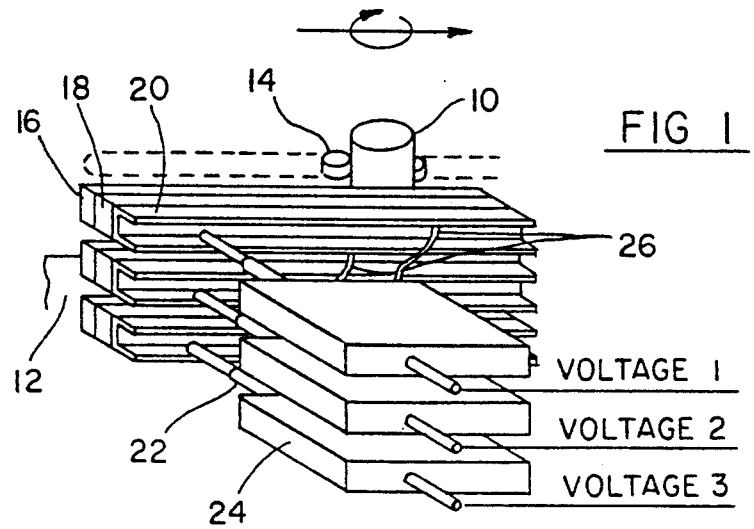
FIG. 1 is an oblique view of the inspection station of a glass container inspection machine.
FIG. 2 is a front view of the CRT screen of the computer which controls the inspection station shown in FIG. 1.

DETAILED DESCRIPTION glass container inspection machine has a station for testing a formed container or bottle (not shown—for calibration purposes a glass standard 10 will be tested) which is supported by a support plate 12 and which is advanced along the support plate 12 by a bottle carrier 14. During its displacement past the test station, the carrier 14 forces the bottle against a number (three as illustrated in FIG. 1 for purposes of clarity, but four can be used) of parallel horizontally extending, vertically spaced capacitance sensing strips 16 which are secured to resilient foam strips 18 mounted on suitable brackets 20. The brackets are connected by posts 22 to corresponding head oscillator assembly housings 24. Each oscillator receives a capacitance signal from its associated capacitance sensing strip via a calibrated cable 26 and generates a continuous voltage signal which is supplied to a computer.

It has been discovered that an equation can be defined that will define the thickness of a non-standard bottle which when sensed by a gage head will result in the generation of a voltage signal equal to the voltage signal generated as a result of sensing the standard by the same gage. This defined thickness is referred to as the "calibration thickness". This "calibration thickness" is a function of the container diameter (which is different than the diameter of one of the standards) and the thickness of the calibration standard. An algorithm which accurately represents this relationship for U.S. standard measures (inches) is:

Calibration Thickness = {((Calibration Standard Diameter in inches − Container Diameter in inches) × 0.2) + 1} × Calibration Standard Thickness in mils, For the Metric System this equation is: Calibration Thickness = {((Calibration Standard Diameter in millimeters − Container Diameter in millimeters) × 0.0079) + 1} × Calibration Standard Thickness in millimeters.

The following example shows how to use the calibration formula to compute a calibration thickness. The calculation here is for the first line under Channel 1 on the Calibrate Head Screen 30 of the controller.

For this example, the calibration standards shipped are each $2\frac{1}{2}$ inches in diameter. The bottle to be inspected is $2\frac{3}{4}$ inches in diameter. Standard 1 has thicknesses of 0.037 and 0.062 stamped on it. Standard 2 has thicknesses of 0.047 and 0.072 stamped on it.

STEP 1

Compute the difference between the container diameter and the Calibration Standard diameter.

| | | |
|---|---|---|
| a. Calibration Standard Diameter (inches) | | 2.5 |
| b. Container Diameter (inches) | | 2.75 |
| c. Subtract Line b. from Line a. (The result may be a negative number) | | −0.25 |

STEP 2

Compute the thickness to be entered on the Calibrate Head Screen.

| | | |
|---|---|---|
| a. Multiply by 0.2 and add 1 | | .950 |
| b. Calibration Standard Thickness (mils) | | .037 |
| c. Multiply Line a. by Line b. Round to the nearest thousandth. This is the calibration thickness to be entered on the Calibrate Head Screen. | | .035 |

The operator enters this calibration thickness under channel 1 and then places that thickness location of the standard against the sensing station to input a voltage (2.56) for that thickness. This process will be repeated at least one more time and preferably three more times to define four different calibration thicknesses for the first channel. This will be repeated for each channel to properly calibrate the head. The computer can then, based on this data, define a curve used to convert voltage to wall thickness.

Figure 3:
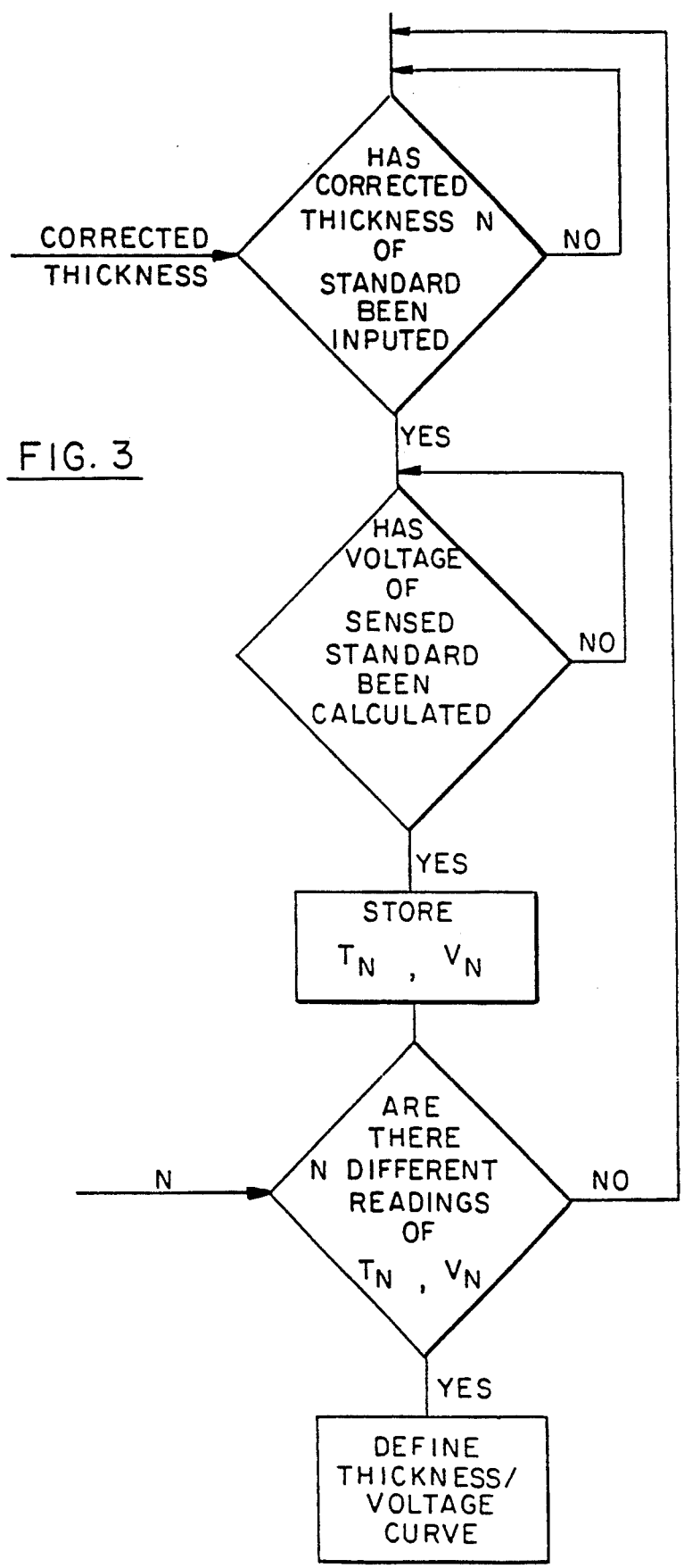
FIG. 3 is a logic diagram illustrating the invention.

Ideally, the actual bottle should be the size of the standard +/− one inch. FIG. 3 illustrates this sequence.

We claim:

1. A method for calibrating a wall thickness inspection system having sensing means for producing a voltage representative of the thickness of the sensed wall of a glass container and control means for defining the sensed voltage as a thickness based on a voltage/thickness curve defined by at least two inputted points wherein the actual container to be inspected has a dimension different than the dimension of an available standard container, the method comprising defining the plurality of inputted points by calculating at least two calibration thicknesses of the actual glass container to be tested which will result in the same voltage being sensed as will be sensed by the sensing means when a corresponding number of known thicknesses on the standard container are sensed, using the following equation, {(((Calibration Standard Diameter in inches−Container Diameter in inches)×0.2)+1}×Calibration Standard Thickness in mils, and equating these calibration thicknesses to the corresponding voltages produced by the sensing means when sensing said at least two thicknesses of the standard.

* * * * *